US011543342B2

United States Patent
Misener et al.

(10) Patent No.: US 11,543,342 B2
(45) Date of Patent: Jan. 3, 2023

(54) FLOW CYTOMETER AND LASER OPTICS ASSEMBLY THEREOF

(71) Applicant: IDEXX Laboratories Inc., Westbrook, ME (US)

(72) Inventors: Garland Christian Misener, Portland, ME (US); Michael Ryan Moon, Scarborough, ME (US); Spencer Franklin McElwain, Portland, ME (US)

(73) Assignee: IDEXX Laboratories, Inc., Westbrook, ME (US)

( * ) Notice: Subject to any disclaimer, the term of this patent is extended or adjusted under 35 U.S.C. 154(b) by 24 days.

(21) Appl. No.: 17/348,298

(22) Filed: Jun. 15, 2021

(65) Prior Publication Data

US 2021/0396646 A1 Dec. 23, 2021

Related U.S. Application Data

(60) Provisional application No. 63/040,035, filed on Jun. 17, 2020.

(51) Int. Cl.
*G01N 15/14* (2006.01)
*G01N 15/00* (2006.01)

(52) U.S. Cl.
CPC ... *G01N 15/1436* (2013.01); *G01N 2015/008* (2013.01)

(58) Field of Classification Search
CPC ......... G01N 15/1436; G01N 2015/008; G01N 2015/1006; G01N 2015/144;

(Continued)

(56) References Cited

U.S. PATENT DOCUMENTS 3,925,018 A 12/1975 Saunders
4,013,368 A 3/1977 Acker et al.
(Continued)

FOREIGN PATENT DOCUMENTS

| CN | 106707449 A | 5/2017 |
|---|---|---|
| EP | 0887637 A2 | 12/1998 |
| EP | 1245944 A2 | 10/2002 |

OTHER PUBLICATIONS

Strokotov, D. I. et al., "Polarized light-scattering profile-advanced characterization of nonspherical particles with scanning flow cytometry: Polarized Light Scattering" Cytometry Part A (May 2011) pp. 570-579, vol. 79A, No. 7.

(Continued)

*Primary Examiner* — Roy M Punnoose
(74) *Attorney, Agent, or Firm* — Carter, DeLuca & Farrell LLP

(57) ABSTRACT

A flow cytometer of a blood analyzer including a transverse-electric (TE) laser diode, a flow cell, a quarter wave plate (QWP), a plurality of lenses, and a side scatter detector. The TE laser diode is configured to output a laser beam along an optical axis and has a fast axis full width at half maximum (FWHM) divergence of from about 16 degrees to about 25 degrees. The QWP is disposed along the optical axis between the TE laser diode and the flow cell and configured to circularly polarize the laser beam. The plurality of lenses is disposed between the TE laser diode and the flow cell and configured to focus the laser beam at the flow cell.

28 Claims, 5 Drawing Sheets

(58) Field of Classification Search
CPC .............. G01N 15/1434; G02B 5/3083; G02B 27/0916; G02B 19/0052
See application file for complete search history.

(56) References Cited

U.S. PATENT DOCUMENTS

| | | |
|---|---|---|
| 4,043,669 A | 8/1977 | Gehatia et al. |
| 4,250,394 A | 2/1981 | O'Connor |
| 4,284,412 A | 8/1981 | Hansen et al. |
| 4,565,448 A | 1/1986 | Abbott et al. |
| 4,606,636 A | 8/1986 | Monin et al. |
| 4,665,553 A | 5/1987 | Gershman et al. |
| 4,818,103 A | 4/1989 | Thomas et al. |
| 4,954,715 A | 9/1990 | Zold |
| 5,017,497 A | 5/1991 | Grooth et al. |
| 5,093,234 A | 3/1992 | Schwartz et al. |
| 5,125,737 A | 6/1992 | Rodriguez et al. |
| 5,155,044 A | 10/1992 | Ledis et al. |
| 5,179,026 A | 1/1993 | Matsuda et al. |
| 5,264,369 A | 11/1993 | Sakata et al. |
| 5,284,771 A | 2/1994 | Fan et al. |
| 5,308,772 A | 5/1994 | Sakata et al. |
| 5,350,695 A | 9/1994 | Colella et al. |
| 5,360,739 A | 11/1994 | Fan et al. |
| 5,369,631 A | 11/1994 | Hwang |
| 5,386,287 A | 1/1995 | Berssen et al. |
| 5,408,307 A | 4/1995 | Yamamoto et al. |
| 5,411,891 A | 5/1995 | Fan et al. |
| 5,432,601 A | 7/1995 | Tanaka et al. |
| 5,438,003 A | 8/1995 | Colella et al. |
| 5,451,525 A | 9/1995 | Shenkin et al. |
| 5,467,189 A | 11/1995 | Kreikebaum et al. |
| 5,475,487 A | 12/1995 | Mariella, Jr. et al. |
| 5,492,833 A | 2/1996 | Rodriguez et al. |
| 5,510,267 A | 4/1996 | Marshall |
| 5,540,494 A | 7/1996 | Purvis, Jr. et al. |
| 5,558,998 A | 9/1996 | Hammond et al. |
| 5,585,246 A | 12/1996 | Dubrow et al. |
| 5,616,501 A | 4/1997 | Rodriguez et al. |
| 5,627,037 A | 5/1997 | Ward et al. |
| 5,631,165 A | 5/1997 | Chupp et al. |
| 5,650,847 A | 7/1997 | Maltsev et al. |
| 5,691,204 A | 11/1997 | Kim et al. |
| 5,728,351 A | 3/1998 | Carver, Jr. |
| 5,728,582 A | 3/1998 | Taki et al. |
| 5,733,784 A | 3/1998 | Studholme et al. |
| 5,737,078 A | 4/1998 | Takarada et al. |
| 5,747,343 A | 5/1998 | Tsuchiya et al. |
| 5,753,186 A | 5/1998 | Hanley et al. |
| 5,798,827 A | 8/1998 | Frank et al. |
| 5,850,411 A * | 12/1998 | Major, Jr. .............. B82Y 20/00 372/45.01 |
| 5,858,667 A | 1/1999 | Dertinger et al. |
| 5,872,627 A | 2/1999 | Miers |
| 5,874,310 A | 2/1999 | Li et al. |
| 5,874,311 A | 2/1999 | Li et al. |
| 5,891,733 A | 4/1999 | Inoue |
| 5,917,584 A | 6/1999 | Li et al. |
| 5,939,326 A | 8/1999 | Chupp et al. |
| 5,940,177 A | 8/1999 | Esser et al. |
| 6,067,157 A | 5/2000 | Altendorf |
| 6,074,879 A | 6/2000 | Zelmanovic et al. |
| 6,228,652 B1 | 5/2001 | Rodriguez et al. |
| 6,232,125 B1 | 5/2001 | Deka et al. |
| 6,261,519 B1 | 7/2001 | Harding et al. |
| 6,271,035 B1 | 8/2001 | Deka et al. |
| 6,320,656 B1 | 11/2001 | Ferrante et al. |
| 6,365,106 B1 | 4/2002 | Nagai |
| 6,410,337 B1 | 6/2002 | Brady et al. |
| 6,612,719 B2 | 9/2003 | Richardson et al. |
| 6,713,019 B2 | 3/2004 | Ozasa et al. |
| 6,859,277 B2 | 2/2005 | Wagner et al. |
| 7,053,783 B2 | 5/2006 | Hamburger et al. |
| 7,064,823 B2 | 6/2006 | Roche et al. |
| 7,110,192 B2 | 9/2006 | Sauter et al. |
| 7,215,425 B2 | 5/2007 | Rezachek et al. |
| 7,324,194 B2 | 1/2008 | Roche et al. |
| 7,385,682 B2 | 6/2008 | Chu et al. |
| 7,561,267 B2 | 7/2009 | Luo et al. |
| 7,787,197 B2 | 8/2010 | Chen |
| 7,800,742 B2 | 9/2010 | Fukuda et al. |
| 7,876,436 B2 | 1/2011 | Chu |
| 8,366,298 B2 | 2/2013 | Misener et al. |
| 8,619,370 B2 | 12/2013 | Hunter et al. |
| 9,523,857 B2 | 12/2016 | Heanue et al. |
| 9,823,178 B2 | 11/2017 | Fujiwara et al. |
| 10,914,913 B2 * | 2/2021 | Misener ................ G02B 7/028 |
| 2002/0141902 A1 * | 10/2002 | Ozasa ................ G01N 15/1434 436/63 |
| 2003/0030783 A1 | 2/2003 | Roche et al. |
| 2006/0256335 A1 | 11/2006 | Chen |
| 2009/0079981 A1 | 3/2009 | Holve |
| 2016/0025611 A1 | 1/2016 | Fujiwara et al. |
| 2016/0370280 A1 * | 12/2016 | Yamamoto ......... G01N 15/1427 |
| 2019/0302391 A1 * | 10/2019 | Misener ................ G02B 7/028 |

OTHER PUBLICATIONS

International Search Report and Written Opinion issued in corresponding International Application No. PCT/US2021/037417, dated Sep. 27, 2021, pp. 1-15.

Provisional Opinion Accompanying the Partial Search Report (Annex to Invitation to Pay Additional Fees) issued in corresponding International Application No. PCT/US2019/024568 dated Jul. 4, 2019, 12 pages.

International Search Report and Written Opinion issued in corresponding International Application No. PCT/US2019/024568 dated Oct. 16, 2019, 23 pages.

Vogt, Jr. et al., "Model System Evaluating Fluorescein-Labeled Microbeads as Internal Standards to Calibrate Fluorescence Intensity on Flow Cytometers.sup.1,2", Cytometry, 10:294-302 (1989).

Young Ran Kim et al., "Isovolumetric Sphering of Erythrocytes for More Accurate and Precise Cell Volume Measurement by Flow Cytometry.sup.1", Cytometry, vol. 3, No. 6, 419-427 (1983).

Supplemental Partial European Search Report issued in EP 01937695 completed Dec. 15, 2005, 2 pages.

International Search Report issued in PCT/US01/16814 dated Aug. 27, 2001, 2 pages.

International Preliminary Report on Patentability and Written Opinion issued in International Application No. PCT/US2019/024568 dated Oct. 15, 2020, 16 pages.

* cited by examiner

| Focused Beam Diametric 1/e² Waist, μm | Focal Length of Objective Lens, mm, Assuming 5.5 mm Focal Length Collimating Lens | | | | | | | |
|---|---|---|---|---|---|---|---|---|
| | 19 | 25 | 31 | 37 | 43 | 49 | 55 |
| 5 | 24.7 | 32.5 | 40.3 | 48.1 | 55.9 | 63.7 | 71.5 |
| 7 | 17.6 | 23.2 | 28.8 | 34.3 | 39.9 | 45.5 | 51.0 |
| 9 | 13.7 | 18.0 | 22.4 | 26.7 | 31.0 | 35.4 | 39.7 |
| 11 | 11.2 | 14.8 | 18.3 | 21.9 | 25.4 | 28.9 | 32.5 |
| 13 | 9.5 | 12.5 | 15.5 | 18.5 | 21.5 | 24.5 | 27.5 |
| 15 | 8.2 | 10.8 | 13.4 | 16.0 | 18.6 | 21.2 | 23.8 |
| 17 | 7.3 | 9.6 | 11.8 | 14.1 | 16.4 | 18.7 | 21.0 |
| 19 | 6.5 | 8.5 | 10.6 | 12.7 | 14.7 | 16.8 | 18.8 |
| 21 | 5.9 | 7.7 | 9.6 | 11.4 | 13.3 | 15.2 | 17.0 |
| 23 | 5.4 | 7.1 | 8.8 | 10.5 | 12.1 | 13.8 | 15.5 |
| 25 | 4.9 | 6.5 | 8.1 | 9.6 | 11.2 | 12.7 | 14.3 |
| 27 | 4.6 | 6.0 | 7.5 | 8.9 | 10.3 | 11.8 | 13.2 |
| 29 | 4.3 | 5.6 | 6.9 | 8.3 | 9.6 | 11.0 | 12.3 |
| 31 | 4.0 | 5.2 | 6.5 | 7.8 | 9.0 | 10.3 | 11.5 |
| 33 | 3.7 | 4.9 | 6.1 | 7.3 | 8.5 | 9.6 | 10.8 |
| 35 | 3.5 | 4.6 | 5.8 | 6.9 | 8.0 | 9.1 | 10.2 |
| 37 | 3.3 | 4.4 | 5.4 | 6.5 | 7.6 | 8.6 | 9.7 |

Beam Divergence FWHM, Degrees

FIG. 4

| | LightPath Catalog Collimating Lenses Selected by Design Wavelength [633nm ≤ λ ≤ 780 nm], Descending Numerical Aperture (NA ≥ 0.4), and Clear Aperture (CA > 4 mm) | | | | | | $f_{coll}$ (mm) |
|---|---|---|---|---|---|---|---|
| | 4.51 | 5.5 | 4.6 | 6.75 | 10 | 8 | a (mm) |
| | 4.95 | 6 | 4.8 | 7 | 10 | 8 | |
| Relative Beam intensity at Clipping Aperture  5 | 0.0% | 0.0% | 0.0% | 0.0% | 0.0% | 0.0% | |
| 7 | 0.0% | 0.0% | 0.0% | 0.0% | 0.0% | 0.0% | |
| 9 | 0.0% | 0.0% | 0.0% | 0.0% | 0.0% | 0.0% | |
| 11 | 0.0% | 0.0% | 0.0% | 0.0% | 0.0% | 0.0% | |
| 13 | 0.0% | 0.0% | 0.0% | 0.0% | 0.0% | 0.0% | |
| 15 | 0.0% | 0.0% | 0.0% | 0.0% | 0.0% | 0.0% | |
| 17 | 0.0% | 0.0% | 0.0% | 0.0% | 0.0% | 0.0% | |
| 19 | 0.1% | 0.1% | 0.1% | 0.1% | 0.0% | 0.0% | |
| 21 | 0.2% | 0.2% | 0.4% | 0.4% | 0.2% | 0.2% | |
| 23 | 0.6% | 0.7% | 1.0% | 1.1% | 0.6% | 0.6% | |
| 25 | 1.4% | 1.5% | 2.2% | 2.3% | 1.5% | 1.5% | |
| 27 | 2.7% | 2.8% | 3.8% | 3.9% | 2.9% | 2.9% | |
| 29 | 4.4% | 4.6% | 6.0% | 6.2% | 4.9% | 4.9% | |
| 31 | 6.6% | 6.8% | 8.6% | 8.9% | 7.5% | 7.5% | |
| 33 | 9.3% | 9.5% | 12% | 12% | 11% | 11% | |
| 35 | 12% | 13% | 15% | 15% | 14% | 14% | |
| 37 | 15% | 16% | 19% | 19% | 17% | 17% | |
| | | | | | 21% | 21% | |

Beam Divergence FWHM, Degrees

FIG. 5

FLOW CYTOMETER AND LASER OPTICS ASSEMBLY THEREOF

CROSS REFERENCE TO RELATED APPLICATIONS

The present application claims the benefit of and priority to U.S. Provisional Application No. 63/040,035, filed on Jun. 17, 2020, the entire contents of which are hereby incorporated herein by reference.

BACKGROUND

Technical Field

The present disclosure relates to flow cytometry and, more particularly, to a flow cytometer and a laser optics assembly for a flow cytometer, e.g., of a hematology or blood analyzer.

Background of Related Art

Flow cytometers typically require a laser beam to pass through a relatively narrow sample core stream such that particles flowing through the sample core stream are illuminated by the laser beam, absorbing and scattering the laser light in accordance with the refractive indices, sizes, shapes, and other properties of the particles. For each particle, the light intensities absorbed and scattered are measured. The absorption and scattering measurements are used to identify and quantify particle types and particle characteristics. More recently, time-of-flight (TOF) measurements have been additionally or alternatively utilized to determine particle types and/or characteristics.

In flow cytometers, it is important to maintain a good-quality Gaussian spatial intensity profile of the beam parallel to the core stream flow. In this case, as a particle flows through the profile, the scattered light detected will also have a Gaussian intensity profile, temporally, where the detected scattering signals increase as the particle flows into the Gaussian intensity profile of the beam, maximize at the beam's spatial intensity maximum, and then decrease as the particles flow out of the Gaussian intensity profile of the beam.

Profile intensity lobes, e.g., shoulders on or relatively small peaks near the Gaussian peak, are undesirable because they can be mistaken as small particles when a large particle flows through the beam. While the effects of the lobes can be mitigated by ignoring small peaks or shoulders on either side of the Gaussian peak, this is not an optimum solution because meaningful information occurring coincident with the lobes can be lost.

Another concern in some flow cytometers is to set the width of the Gaussian intensity profile such that the TOF measured for some or all particle types can be used as a reliable particle differentiator. If the width is too large, resolution is lost for smaller particles.

SUMMARY

The present disclosure provides a flow cytometer and laser optics assembly thereof that: eliminates profile intensity lobes or reduces the lobes to small or negligible intensities, e.g., at most 7% of the intensity of the main Gaussian peak; provides good time-of-flight (TOF) capability; enables detection of light scattered at relatively low forward angles (relative to the optical axis of the laser beam), e.g., less than or equal to 30 degrees, and relatively high side angles (relative to the optical axis of the laser beam), e.g., from 50 degrees to 120 degrees; and provides good sensitivity to both forward and side scattering, for both depolarized and polarized scattered light.

The above and other aspects and features of the present disclosure are detailed below. To the extent consistent, any of the aspects and features detailed herein may be utilized with or without any of the other aspects and features detailed herein, regardless of whether such aspects and features are described together or separately hereinbelow.

Provided in accordance with aspects of the present disclosure is a flow cytometer of a blood analyzer including a transverse-electric (TE) laser diode, a flow cell, a quarter wave plate (QWP), a plurality of lenses, and a side scatter detector. The TE laser diode is configured to output a laser beam along an optical axis. The laser beam has a fast axis full width at half maximum (FWHM) divergence of from about 16 degrees to about 25 degrees. The QWP is disposed along the optical axis between the TE laser diode and the flow cell and is configured to circularly polarize the laser beam as it passes therethrough. The plurality of lenses is disposed between the TE laser diode and the flow cell. The lenses cooperate to focus the laser beam at the flow cell. The side scatter detector is configured to detect side-scattered light from the flow cell at angles of from about 50 degrees to about 120 degrees relative to the optical axis.

In an aspect of the present disclosure, at least one forward scatter detector is provided. In aspects, at least two forward scatter detectors are provided, e.g., one or more high-angle forward scattering detectors (FSH) and a low-angle forward scattering detector (FSL). An extinction sensor may additionally or alternatively be provided. The at least one forward scatter detector, e.g., the one or more FSH, may be configured to detect forward-scattered light from the flow cell at angles less than about 30 degrees relative to the optical axis. In such aspects, the at least one forward scatter detector may be configured to detect forward scattered light from the flow cell at angles of from about 11.5 degrees to about 15.5 degrees relative to the optical axis. Additionally or alternatively, the at least one forward scatter detector, e.g., the FSL, may be configured to detect forward scattered light from the flow cell at angles of from about 2.0 degrees to about 2.4 degrees relative to the optical axis.

In another aspect of the present disclosure, the side scattering detection angle, relative to the laser beam centroid, with its vertex at the center of the core stream, is centered at 78 degrees to provide a strong side scattering signal. Scattering intensity is detectable, for example, through a circular lens aperture subtending about 67 degrees to about 89 degrees relative to the optical axis. The maximum aperture width may occur at about 78 degrees. Additionally or alternatively, side-scattered light intensity from the flow cell may be detected by the side scatter detector at an angular range of from about 50 degrees to about 120 degrees relative to the optical axis. This may be accomplished, for example, by employing a high numerical aperture detector without any collection or focusing lens such as detailed in U.S. Pat. No. 6,618,143, the entire contents of which are hereby incorporated herein by reference.

In still another aspect of the present disclosure, the QWP is positioned relative to the TE laser diode such that a centroid angle of incidence of the laser beam on the QWP is equal to or less than about 7 degrees.

In yet another aspect of the present disclosure, birefringent axes of the QWP are rotated±45 degrees about the optical axis relative to a polarization axis of the laser beam to thereby right-handedly or left-handedly circularly polarize the laser beam.

In still yet another aspect of the present disclosure, the plurality of lenses includes a collimating lens disposed between the laser diode and the QWP and an objective lens disposed between the QWP and the flow cell. In such aspects, the plurality of lenses may further include a positive cylindrical lens and a negative cylindrical lens disposed between the collimating lens and the objective lens.

In another aspect of the present disclosure, the laser beam, at the core stream of the flow cell, defines a beam waist $1/e^2$ diameter in a direction parallel to a flow direction of the core stream of from about 6.7 μm to about 9 μm and/or a beam $1/e^2$ diameter in a direction perpendicular to the flow direction of the flow cell of from about 140 μm to about 210 μm.

In another aspect of the present disclosure, the TE laser diode is configured to output a power of at least 10 mW. Additionally or alternatively, the TE laser diode is configured to output a power of at least 20 mW.

A method of detecting reticulocytes and granulocytes provided in accordance with the present disclosure includes flowing a blood sample having at least one of reticulocytes or granulocytes, together with a sheath fluid, through a flow cell; emitting, from a transverse-electric (TE) laser diode, a laser beam along an optical axis, the laser beam having a fast axis full width at half maximum (FWHM) divergence of from about 16 degrees to about 25 degrees; passing the laser beam through a quarter wave plate (QWP) disposed along the optical axis between the TE laser diode and the flow cell to circularly polarize the laser beam as it passes therethrough; passing the laser beam through a plurality of lenses disposed between the TE laser diode and the flow cell to focus the laser beam at the flow cell; and detecting side-scattered light from the flow cell at angles of from about 50 degrees to about 120 degrees relative to the optical axis.

In an aspect of the present disclosure, the method further includes detecting forward-scattered light from the flow cell at angles less than about 30 degrees relative to the optical axis. In such aspects, forward-scattered light from the flow cell may be detected at angles of from about 11.5 degrees to about 15.5 degrees relative to the optical axis. At least one forward scatter detector may be utilized, e.g., one or more high-angle forward scattering detectors (FSH) for detecting at the above-noted angles. Alternatively or additionally, a low-angle forward scattering detector (FSL) may be provided for detecting light scattered at lower angles, e.g., at angles of from about 2.0 degrees to about 2.4 degrees relative to the optical axis. An extinction sensor may additionally or alternatively be provided.

In another aspect of the present disclosure, the side scattering detection angle relative to the laser beam centroid is centered at 78 degrees to provide a strong side scattering signal. Scattering intensity is detectable, in aspects, through a circular lens aperture subtending about 67 degrees to about 89 degrees relative to the optical axis. Additionally or alternatively, side-scattered light intensity from the flow cell is detected by the side scatter detector at an angular range of from about 50 degrees to about 120 degrees relative to the optical axis. This may be accomplished, for example, by employing a high numerical aperture detector without any collection or focusing lens.

In yet another aspect of the present disclosure, the laser beam passing through the QWP defines a centroid angle of incidence of the laser beam on the QWP that is equal to or less than about 7 degrees.

In still another aspect of the present disclosure, the laser beam passing through the QWP is right-handedly or left-handedly circularly polarized by the QWP.

In still yet another aspect of the present disclosure, the plurality of lenses includes a collimating lens positioned such that the laser beam passes through the collimating lens before the QWP. In such aspects, the plurality of lenses may further include an objective lens positioned such that the laser beam passes through the objective lens after the QWP.

In another aspect of the present disclosure, the laser beam, at the flow cell, defines a beam waist $1/e^2$ diameter in a direction parallel to the flowing of about 6.7 μm to about 9 μm and/or a beam $1/e^2$ diameter in a direction perpendicular to the flowing of about 140 μm to about 210 μm.

In yet another aspect of the present disclosure, a power output of the TE laser diode for emitting the laser beam is at least 10 mW; in other aspects, at least 20 mW.

BRIEF DESCRIPTION OF THE DRAWINGS

Various aspects and features of the presently disclosed flow cytometer and laser optics assembly thereof are described herein with reference to the drawings wherein like reference numerals identify similar or identical elements.

FIG. 4 is a table illustrating the relationship between beam divergence and focused beam diametric $1/e^2$ waist at selected objective lens focal lengths; and FIG. 5 is a table illustrating the relationship between beam divergence and relative beam intensity at a lens' clear aperture for selected collimating lenses having specified focal lengths and clear aperture diameters.

DETAILED DESCRIPTION

Figure 1:
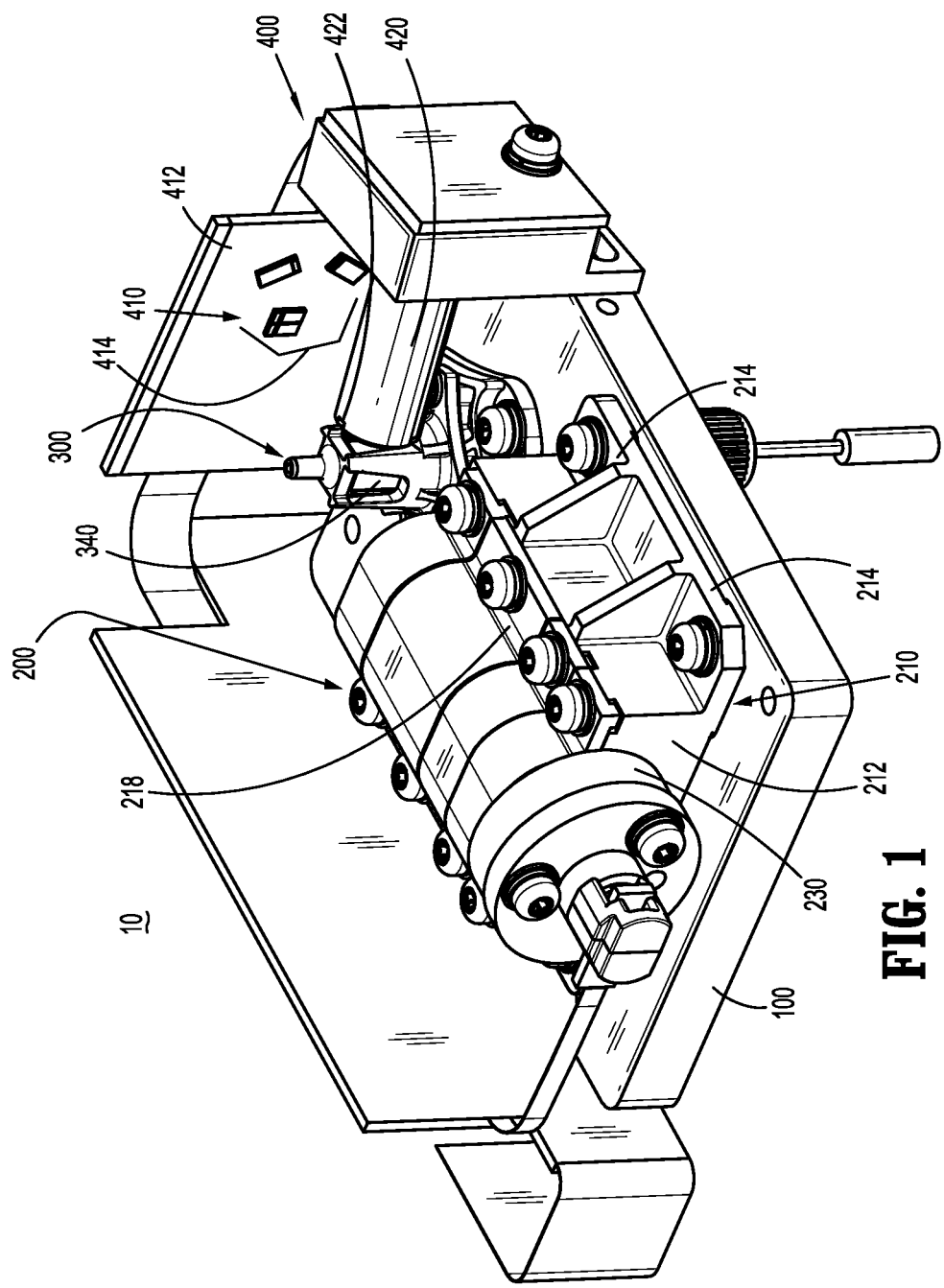
FIG. 1 is a perspective view of a module comprising laser optics, flow cell, and sensors of a flow cytometer provided in accordance with the present disclosure.
Figure 2:
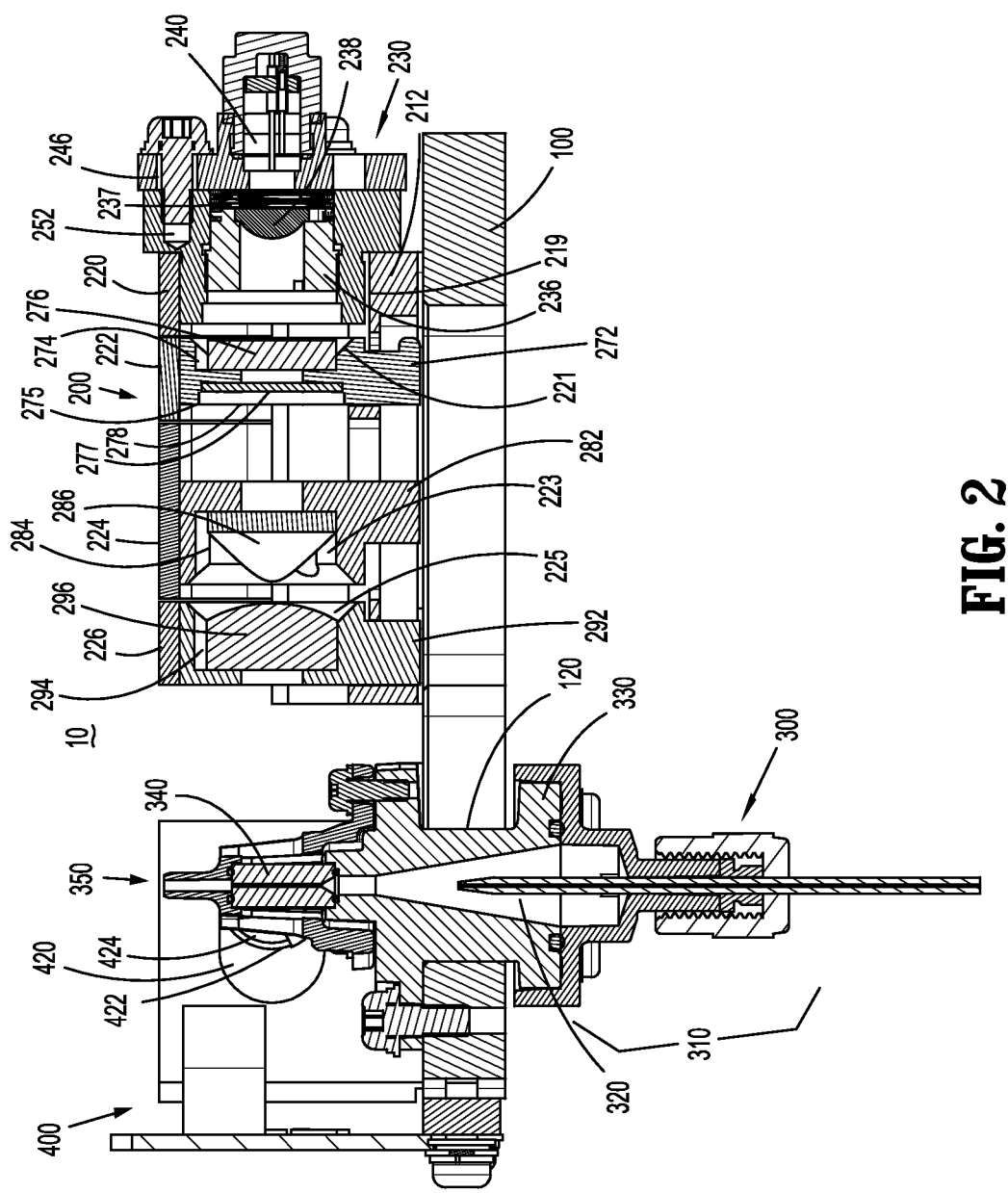
FIG. 2 is a longitudinal, cross-sectional view of the module of FIG. 1.

Turning to FIGS. 1 and 2, the present disclosure provides a flow cytometer, e.g., of a hematology or blood analyzer, including a module comprising laser optics, flow cell, and sensors shown generally identified by reference numeral 10. Module 10 generally includes a mounting platform 100, a laser optics assembly 200 secured to mounting platform 100, a flow cell assembly 300 secured to mounting platform 100 and operably positioned relative to laser optics assembly 200, and a sensor assembly 400 secured to mounting platform 100 and operably positioned relative to laser optics assembly 200 and flow cell assembly 300 for both forward and side scatter detection. Additional features of module 10 not explicitly detailed or contradicted herein can be found in U.S. Patent Application Publication No. 2019/0302391, titled "FLOW CYTOMETER, LASER OPTICS ASSEMBLY THEREOF, AND METHODS OF ASSEMBLING THE SAME" and filed on Mar. 28, 2019, the entire contents of which are hereby incorporated herein by reference.

Although not shown, the flow cytometer may, in addition to module 10, include, for example, an outer housing enclosing the internal operable components of the flow cytometer, an electronics module configured to control module 10 and process test results received therefrom, a sample receiving module configured to receive a sample to be tested, a pump module configured to pump the sample and a sheath fluid into the flow cell assembly 300, a waste module configured to enable safe collection of the sample and sheath fluid after testing, and a user interface module for receiving input information from and displaying information to a user. Alternatively or additionally, any other suitable modules, components, and/or features for use with module 10 of the flow cytometer of the present disclosure are also contemplated.

As noted above, mounting platform 100 of module 10 enables mounting of laser optics assembly 200, flow cell assembly 300, and sensor assembly 400 thereon, e.g., using bolts and/or any other suitable fastening structures, to maintain the relative positions of these assemblies 200-400 relative to one another and mounting platform 100.

Laser optics assembly 200 is described in greater detail below.

Continuing with reference to FIGS. 1 and 2, flow cell assembly 300 includes an input 310 coupled to a nozzle 320 defined by a housing 330 for delivering the sample fluid to nozzle 320 and a sheath fluid to input 310, a flow cell 340 connected downstream of nozzle 320 to receive the sample and sheath fluid therefrom, and an output 350 disposed downstream of flow cell 340 to direct the sample and sheath fluid to a suitable collection reservoir after testing. Housing 330 of flow cell assembly 300 is seated within an aperture 120 defined through mounting platform 100 and is secured to mounting platform 100 using a plurality of bolts or in any other suitable manner to maintain a prescribed distance between flow cell 340 and cylindrical objective lens 296 of laser optics assembly 200.

Sensor assembly 400 includes a forward scatter sub-assembly 410 and a side scatter sub-assembly 420. Forward scatter sub-assembly 410 includes a board 412 and a sensor array 414 including an extinction sensor, a forward scatter low angle (FSL) sensor, and one or more forward scatter high angle (FSH) sensors, e.g., two FSH sensors. The configuration of module 10 and, more specifically, laser optics assembly 200 thereof, detailed below, enables sensor array 414 of forward scatter sub-assembly 410 to detect forward-scattered light from flow cell 340 at relatively low angles of, for example, less than or equal to about 30 degrees relative to the optical axis of the laser beam. In embodiments, forward light scatter is detected at angles in a range of about 11.5 degrees to about 15.5 degrees relative to the optical axis of the laser beam using the one or more FSH sensors, and in a range of about 2.0 degrees to about 2.4 degrees using the FSL sensor. The forward scattering intensity at the FSL sensor is approximately proportional to the size of a blood cell.

Side scatter sub-assembly 420 includes a lens mount 422, a lens 424 supported within the lens mount 422, and a side scatter sensor array (not shown). The configuration of module 10 and, more specifically, laser optics assembly 200 thereof, as also detailed below, enables the side scatter sensor array (not shown) of side scatter sub-assembly 420 to detect side-scattered light from flow cell 340 at angles, in embodiments, of from about 50 degrees to about 120 degrees relative to the optical axis of the laser beam; and, in other embodiments, from about 65 degrees to about 91 degrees relative to the optical axis of the laser beam. The maximum sensitivity to side-scattered light may be at about 78 degrees relative to the optical axis. In additional or alternative embodiments, scattering intensity is detectable through a circular lens aperture subtending an angle of about 67 degrees to 89 degrees relative to the optical axis. The maximum aperture width may occur at about 78 degrees, thereby providing more sensitivity to side-scattered light than the case where the same aperture is placed equidistantly but with its maximum width occurring at a higher angle, such as 90 degrees. The side scattering intensity is approximately proportional to the refractive index and internal complexity of a blood cell.

Figure 3:
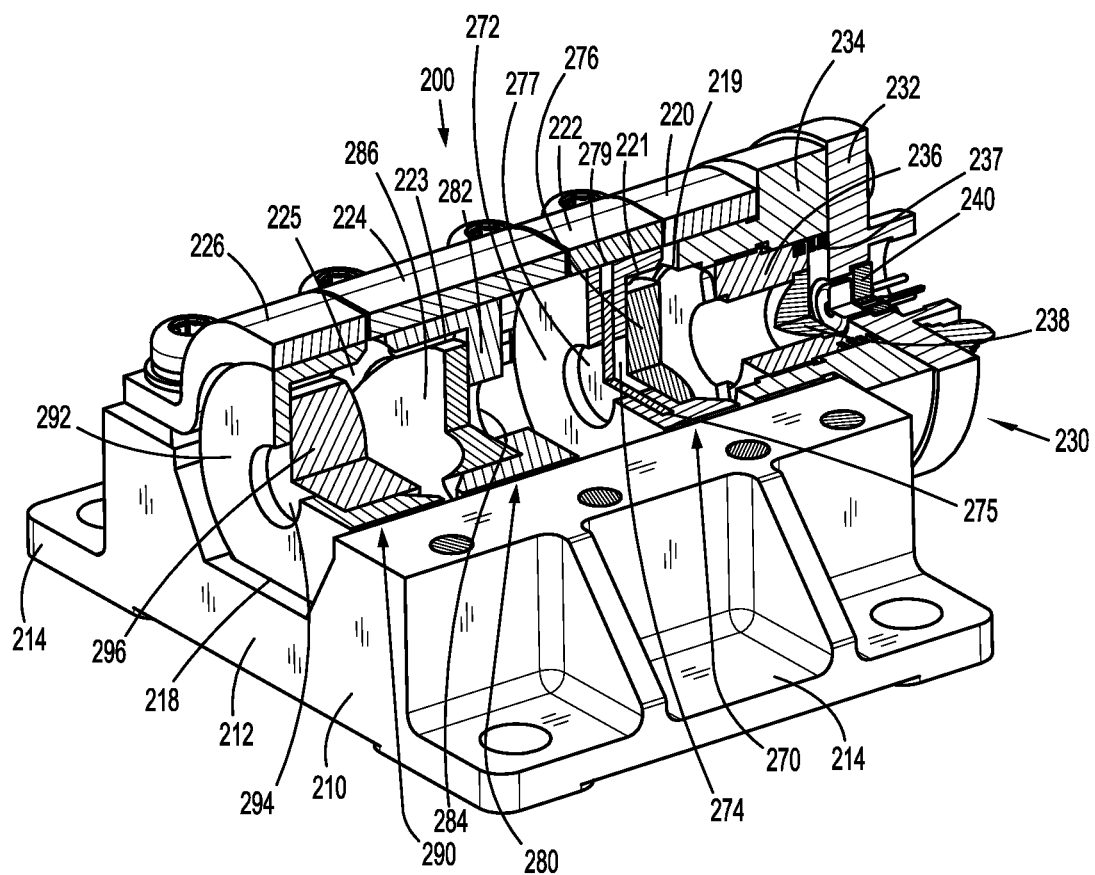
FIG. 3 is a perspective, partial cross-sectional view of a laser optics assembly of the module of FIG. 1.

Referring to FIGS. 1-3, laser optics assembly 200 includes a clamp sub-assembly 210, a collimation sub-assembly 230, and a plurality of lens sub-assemblies 270, 280, 290. Clamp sub-assembly 210 includes a base plate 212 defining at least one pair of feet 214 along opposed sides thereof that include apertures defined therethrough to enable laser optics assembly 200 to be securely bolted to mounting platform 100. Base plate 212 further defines a generally cylindrical barrel 218 that extends along base plate 212 between feet 214. Barrel 218 defines first, second, third, and fourth chambers 219, 221, 223, and 225 aligned along a length of barrel 218. Chambers 219, 221, 223, and 225 are configured to receive collimation sub-assembly 230 and lens sub-assemblies 270, 280, 290, respectively, therein. Clamp sub-assembly 210 further includes cover plates 220, 222, 224, 226 configured to be securely bolted onto base plate 212 to enclose and secure collimation sub-assembly 230 and lens sub-assemblies 270, 280, 290 within chambers 219, 221, 223, and 225, respectively, and relative to one another.

With particular reference to FIGS. 2 and 3, collimation sub-assembly 230 includes a support disc 232, a support hub 234, an insert 236, and a spring washer 237 that are configured to operably engage one another and retain a collimating lens 238 of collimation sub-assembly 230 in position relative to a laser diode 240 of collimation sub-assembly 230.

Laser diode 240 is a transverse electric (TE) laser diode and, thus, the polarization axis of the laser light emitted is perpendicular to the fast or more divergent axis. The fast or more divergent axis has a full width at half maximum (FWHM) divergence of, in embodiments, from about 16 degrees to about 25 degrees; in other embodiments, from about 20 degrees to about 23 degrees; and, in still other embodiments, from about 21 degrees to about 22 degrees.

It is noted that a transverse electric (TE) laser diode is utilized instead of a transverse magnetic (TM) laser diode because TM laser diodes typically have larger fast axis divergences. These larger divergences can cause several problems. First, there is a greater likelihood of beam clipping and, in consequence, larger lobes. Also, there are two other tradeoffs: either a larger focal length objective lens is needed, which makes the laser module longer and more difficult to make insensitive to temperature changes; or both a smaller real or apparent core stream shift insensitivity range along the optical axis and lower sensitivity to time of flight, e.g., for larger white blood cells, must be accepted.

However, use of a TE laser diode, without compensation, has the disadvantage of poor sensitivity to polarized side scattering detection. Good sensitivity to polarized side scattering is especially relevant for identification of reticulocytes and granulocytes. The use of a quarter-wave plate 277 along with other configuration features of laser optics assembly 200, as detailed below, compensate for this disadvantage of the TE laser diode 240 such that module 10, as also detailed below, provides good sensitivity to polarized side scattering light.

Laser diode 240 includes a power of, in embodiments, at least about 10 mW, in other embodiments, at least about 20 mW, and in still other embodiments, at least about 40 mW. Powers from 10 mW to 40 mW or 20 mW to 40 mW are also contemplated. Laser diode 240 includes suitable electrical connectors that enable connection thereof to power and control electronics (not shown). Laser diode 240 may be configured, in embodiments, to emit red light having a wavelength in the range of about 630-665 nm; in other embodiments, in the range of about 635-650 nm; and in still other embodiments, laser diode 240 has a nominal wavelength of about 640 nm. Laser diode 240, in embodiments, is an HL6363MG-A laser diode, available from USHIO OPTO SEMICONDUCTORS, INC. of Tokyo, Japan.

Continuing with reference to FIGS. 2 and 3, laser diode 240 is configured to be secured within support disc 232. Support disc 232 is configured to be secured, e.g., bolted, to support hub 234, which receives insert 236 in threaded engagement therewithin. Collimating lens 238 is disposed within support hub 234 and held in fixed position between insert 236 and support disc 232 via the engagement between support disc 232 and support hub 234 and between insert 236 and support hub 234. Spring washer 237 is positioned between insert 236 and support disc 232 to maintain tension therebetween, thus eliminating play between the various secured components.

The above-detailed engagement of the various components of collimation sub-assembly 230 fixes the horizontal, vertical, and axial alignment of collimating lens 238 and laser diode 240 relative to one another such that a beam emitted from laser diode 240 is both well-collimated and pointing in a direction co-axial with support hub 234. Collimation sub-assembly 230 is assembled onto clamp sub-assembly 210 via seating support hub 234 of collimation sub-assembly 230 within first chamber 219 of barrel 218 of base plate 212 of clamp sub-assembly 210, positioning cover plate 220 about support hub 234, and engaging cover plate 220 with base plate 212 on either side of support hub 234, e.g., via bolts.

Referring still to FIGS. 2 and 3, as noted above, laser optics assembly 200 includes three lens sub-assemblies 270, 280, 290. Each lens sub-assembly 270, 280, 290 includes a lens cradle 272, 282, 292, respectively, defining a lens pocket 274, 284, 294, respectively, configured to fixedly retain a respective lens 276, 286, 296 therein.

Lens cradle 272 of lens sub-assembly 270 further includes an additional lens pocket 275 fixedly retaining a quarter-wave plate (QWP) 277 therein. Additional lens pocket 275 may be accessible via an enlarged end opening 278 defined within lens cradle 272, as shown in FIG. 2, to enable longitudinal insertion of QWP 277 into pocket 275, and/or via a slot 279 defined within lens cradle 272, as shown in FIG. 3, to enable transverse insertion of QWP 277 into pocket 275. Other configurations for seating QWP 277 within pocket 275 are also contemplated. As an alternative to additional lens pocket 275, QWP 277 may be mounted within lens pocket 274 together with lens 276. QWP 277 may be positioned on a side of lens 276 opposite collimating lens 238, or may be positioned on the collimating lens-side of lens 276. As another alternative, QWP 277 may be disposed within collimation sub-assembly 230 and positioned on the same side of collimating lens 238 as lens 276 (and, thus, the opposite side as laser diode 240). In any of the above configurations, laser optics assembly 200 may be configured such that a centroid angle of incidence of the laser beam on QWP 277 is equal to or less than about 7 degrees.

Lens 276 is configured as a positive cylindrical lens and, as part of lens sub-assembly 270, is configured to be positioned within second chamber 221 of barrel 218 of base plate 212 and secured therein via second cover plate 222 such that positive cylindrical lens 276 is positioned closest to collimating lens 238. Second cover plate 222 also secures QWP 277 within second chamber 221 of barrel 218 of base plate 212 on the opposite side of positive cylindrical lens 276 as compared to collimating lens 238 (or at any other suitable position such as those noted above).

QWP 277 is a birefringent QWP that, in the illustrated configuration, is positioned within second chamber 221 of barrel 218 of base plate 212 and secured therein via second cover plate 222 along with positive cylindrical lens 276. QWP 277 is oriented so that its birefringent axes are rotated ±45 degrees about the laser beam axis relative to the (TE) polarization axis of the laser beam. QWP 277 enables a laser beam traversing the QWP 277 perpendicular to its flat, parallel faces and polarized parallel to a defined slow axis, to traverse the plate about ¼ wavelength slower than a beam polarized parallel to a defined fast axis perpendicular to the slow axis, thus providing circular polarization of the beam. Depending upon the position of the slow and fast axes of QWP 277, the light beam emerging from QWP 277 will be right or left hand circularly polarized. Either right-handed or left-handed polarization may be utilized.

In some configurations, QWP 277 and lens 276 are bonded together, e.g., with the QWP 277 bonded to the planar surface of lens 276, and positioned to maintain the above-detailed orientation of the birefringent axes of QWP 277 relative to the (TE) polarization axis of the laser beam. In this configuration, the birefringent axes of QWP 277 are set at about ±45 degrees to the cylindrical axis of lens 276. Alignment between QWP 277 and lens 276 can be achieved and maintained via the use of measurements and/or fiducials ensuring that the slow and fast axes of the QWP are oriented at ±45 degrees to the axis of curvature of the plano-convex positive cylindrical lens 276.

Lens 286 is configured as a negative cylindrical lens and, as part of lens-sub assembly 280, is configured to be positioned within third chamber 223 of barrel 218 of base plate 212 and secured therein via third cover plate 224 such that negative cylindrical lens 286 is positioned next to positive cylindrical lens 276 on an opposite side thereof relative to collimation sub-assembly 230. Lens 296 is configured as a cylindrical objective lens and, as part of lens-sub assembly 290, is configured to be positioned within fourth chamber 225 of barrel 218 of base plate 212 and secured therein via fourth cover plate 226 such that cylindrical objective lens 296 is positioned next to negative cylindrical lens 286 on an opposite side thereof relative to positive cylindrical lens 276.

During assembly, once collimation sub-assembly 230 is installed, lens sub-assembly 290 is then inserted into chamber 225, rotationally adjusted, and secured via cover plate 226 to fix lens sub-assembly 290 in position relative to base plate 212 under compression such that lens sub-assembly 290 is installed at a distance from collimating lens 238 approximately equal to the sum of the focal lengths of the lens 296 and collimating lens 238. During installation of lens sub-assembly 290, a verification is conducted to ensure the beam waist $1/e^2$ diameter is minimized and within about 6.7 µm to about 9 µm, in a direction parallel to the direction along which the core stream will flow through flow cell 340.

After the assembly and verification of lens sub-assembly 290, lens sub-assembly 270 is inserted into chamber 221, rotationally adjusted, and secured via cover plate 222 to fix lens sub-assembly 270 in position relative to base plate 212 under compression. Positive cylindrical lens 276 of lens sub-assembly 270 is rotationally aligned such that its axis of dioptric power is perpendicular to that of cylindrical objective lens 296, and this is verified by again confirming that the beam waist $1/e^2$ diameter of about 6.7 µm to about 9 µm, in the parallel to core stream flow direction, is maintained.

QWP 277 is aligned, as noted above, such that its birefringent axes are rotated±45 degrees about the laser beam axis relative to the (TE) polarization axis of the laser beam. This may be accomplished separately from the alignment of lens 276 or together therewith. In configurations where lens 276 and QWP 277 are secured relative to one another before installation into chamber 221, the relative orientation therebetween is selected to enable alignment together with one another to achieve the above-noted alignments. Proper orientation of lens 276 to QWP 277 may be achieved when the two components are bonded together. In such instances, alignment of the lens 276 as described above is sufficient for orienting the QWP correctly.

Next, lens sub-assembly 280 is inserted into chamber 223, rotationally and/or axially adjusted, and secured via cover plate 224 to fix lens sub-assembly 280 in position relative to base plate 212 under compression such that the axis of dioptric power of negative cylindrical lens 286 is perpendicular to that of cylindrical objective lens 296 and parallel to that of positive cylindrical lens 276. This is verified by again confirming that the beam waist $1/e^2$ diameter of about 6.7 μm to about 9 μm, in the parallel to core stream flow direction, is maintained. The axial spacing of negative cylindrical lens 286 is adjusted in order to achieve a beam $1/e^2$ width of, in embodiments, about 140 μm to about 210 μm in a direction perpendicular to the direction the core stream will flow through flow cell 340. Although one assembly method is detailed above, other suitable assembly methods in similar or different order are also contemplated.

U.S. Patent Application Publication No. 2019/0302391, previously incorporated herein by reference, details setting the beam $1/e^2$ width to about 200 μm (or from about 190 μm to about 210 μm) in the direction perpendicular to both the core stream flow and the optical axis of the laser beam. This width permits the core stream to shift, in actuality or apparently, within a range of about ±15 μm along the same direction in which the beam width is measured, resulting in a scattering signal degradation of no more than about 5% compared to the case where the laser beam is centered on the core stream. This arrangement is advantageous at least where the flow cell is substantially free of imperfections. More specifically, this arrangement is advantageous at least where the profile of the flow cell perpendicular to the core stream flow is rectangular and substantially free from extrusions, pits, bulk defects, and/or the like, as these imperfections can refract and/or scatter light to the scattering detectors.

To mitigate the effect of flow cell imperfections, the beam $1/e^2$ width in the direction perpendicular to both the core stream flow and the optical axis of the laser beam can be reduced to, in aspects, from about 140 μm to about 160 μm; in other aspects, from about 145 μm to about 155 μm; and still in other aspects, about 150 μm. A beam width of about 150 μm reduces, e.g., on the order of about 5×, the beam intensity at the side walls of the flow cell as compared to a beam width of about 200 μm. A beam width of about 150 μm (or within the above-noted ranges) minimizes or eliminates intermittent scattering or refraction from the flow cell's edges and/or side walls, which may interfere with small particle detection. However, the tradeoff is that with the reduced beam width, the sensitivity to real or apparent core stream shifts increases such that the 5% maximum signal reduction horizontal real or apparent core stream shift range drops to ±12 μm. At ±15 μm, the signal reduction is expected to increase to 8%.

Depending upon the flow cell configuration and precision, the sample(s) to be tested, result processing algorithm(s), the overall system configuration, and/or other factors, taking into account the above-tradeoff, the beam $1/e^2$ width in the direction perpendicular to both the core stream flow and the optical axis of the laser beam may be from about 140 μm to about 210 μm or, more specifically, within any of the ranges noted above or any other suitable range. For example, if the flow cell was precisely formed without any imperfections, then no beam width in the 140 μm to about 210 μm range would result in scattering or refraction from the flow cell's edges and/or side walls. However, adding or forming rounds, fillets, or other irregular features to the interior corners of the flow cell may substantially increase scattering or refraction from wider beam widths. As detailed above, a narrower beam width, e.g., from about 140 μm to about 160 μm or about 150 μm, may be utilized to mitigate this stray light.

With respect to the operation of the module 10, referring generally to FIGS. 1-3, laser diode 240 produces a laser beam along an optical axis. The laser beam emitted from laser diode 240 passes through collimating lens 238, positive cylindrical lens 276, QWP 277, negative cylindrical lens 286, and cylindrical objective lens 296 and is projected into flow cell 340 such that the laser beam incident on the center of the core stream in flow cell 340 defines a first beam waist $1/e^2$ diameter in a direction parallel to the flow direction of the flow cell of about 6.7 μm to about 9 μm and a second beam $1/e^2$ diameter in a direction perpendicular to the flow direction of the flow cell of about 140 μm to about 210 μm (or other suitable range such as those detailed above).

The laser beam incident upon particles within the core stream of flow cell 340 is scattered: forwardly to forward scatter sub-assembly 410 and sideways to side scatter sub-assembly 420. As noted above, forward-scattered light from flow cell 340 is detected at angles of, for example, less than or equal to about 30 degrees or, more specifically, at angles in a range of about 11.5 degrees to about 15.5 degrees (for the FSH sensor(s)) and/or of about 2.0 degrees to about 2.4 degrees (for the FSL sensor). The extinction sensor provides a response proportional to the amount of light lost (to absorbance by or scattering from the particles). Side scattered light, as also noted above, is detected at angles, in embodiments, of from about 50 degrees to about 120 degrees or, more specifically, from about 65 degrees to about 91 degrees and/or with scattering intensity detectable through a circular lens aperture subtending about 67 degrees to about 89 degrees relative to the optical axis. The maximum sensitivity to side-scattered light may be at about 78 degrees.

Further, the TE laser diode 240 and the presence of QWP 277 ensure a full range of linear polarizations to interact with possible electric dipole transitions in scattering chromophores, e.g., such as are present in stained reticulocytes and unstained (or stained) nucleic acid material in nucleated white blood cells. Some of these dipoles, even for polarization-preserved scattering, will have a substantial vertical polarization (parallel to the core stream flow direction). From these dipoles, measurable side scattering intensity can be obtained.

Fully polarized scattering is scattering from the flow cell 340 that preserves the polarization of the incident laser beam in the scattered beam. Fully depolarized scattering, on the other hand, is scattering from the flow cell 340 where the polarization of the scattered beam is random. To enable detection of fully depolarized side scattering, the polarization of the laser beam irradiating the flow cell 340 does not matter; the side-scattering signal is the same regardless of the input polarization. However, for detection of partially or fully polarized scattering, it is important that a substantial component of the scattering polarization is parallel to the direction of flow through the flow cell 340 because only side scattered intensity that has a measurable vertical polarization intensity can be detected.

TE laser diode 240 emits a transverse wave of laser light that is polarized perpendicularly to the direction of flow through the flow cell 340. However, side scattered intensity that preserves the polarization of an input beam polarized perpendicularly to the direction of flow through the flow cell 340, as TE laser diode 240 would produce in the absence of QWP 277, must be zero, meaning detection of fully polarized scattering would not be possible. Accordingly, QWP 277 is utilized to introduce a polarization component parallel to the direction of flow through flow cell 340 to the laser beam originating from TE laser diode 240. As such, the intensity of partially or fully polarized side scattering can be measured. The magnitude of the partially or fully polarized side scattering signal is increased by providing either greater beam irradiance, e.g., power, and/or a greater parallel component of polarization, e.g., as provided by QWP 277, for a given irradiance.

Referring to FIG. 4, the relationship between the beam divergence and the focused beam diametric $1/e^2$ waist at selected objective lens focal lengths is shown in tabular form. The focused beam diametric $1/e^2$ waist, $\omega_0$ (in micrometers), is determined by the following equation:

$$\omega_0 = \frac{2\lambda M^2}{0.85\pi\theta_{FWHM}} * \frac{f_{obj}}{f_{coll}},$$

utilizing the following parameters: $\lambda=0.64$ μm (a red laser diode); $M^2=1.3$ (a typical value for laser diode optics); $\theta_{FWHM}$=the full width at half maximum (FWHM) beam divergence converted to radians from the rows headed by the beam divergence FWHM in degrees; $f_{coll}$=the focal length of the collimating lens; and $f_{obj}$=the focal length of the objective lens. The 0.85 factor converts FWHM to half width at $1/e^2$ maximum beam intensity (instead of ½ maximum beam intensity). For the table shown in FIG. 4, the focal length of the collimating lens is assumed to be 5.5 mm, which may be the focal length of collimating lens 238 (FIGS. 2 and 3). However, the table entries can be modified for different focal lengths of collimating lens by multiplying the table entries by a ratio of the used focal length, 5.5 mm to the desired different focal length. Similarly, for different objective lens focal lengths, the table entries in a given column can be multiplied by a ratio of the desired different focal length to the table heading value, e.g., 37 mm as provided in the fourth column. The divergence relevant to providing the desired beam width range is that which is parallel to the direction of flow through the flow cell.

Continuing with reference to FIG. 4, the table shows that for low beam FWHM divergences, e.g., less than about 10 degrees, the beam will be undesirably wide for any preferred objective lens focal length. In these cases, accurately measuring the time of flight of smaller blood cells is compromised if not impossible. Similarly, the more divergent the beam, the greater the objective lens focal length needed to provide a large enough diametric beam waist to avoid oversensitivity to core stream shifts. The unshaded cells in the table of FIG. 4 indicate suitable parameter sets, e.g., beam divergence and objective lens focal length, and, thus, suitable lens and laser diode configurations for implementation in laser optics assembly 200 (FIGS. 1-3), although other suitable parameters and components realizing the same are also contemplated.

Referring to FIG. 5, the relative (to the assumed centered beam intensity maximum) beam intensities at a collimating lens' limiting clear aperture for $\theta_{FWHM}$ as in FIG. 4 are illustrated as a function of beam divergence, aperture diameter, and the focal length of the collimating lens. The entries are determined by the following equation:

$$I_a = e^{\left(\frac{-2(a/2)^2}{(1.7*f_{coll}*\tan(\theta_{FWHM}/2))^2}\right)},$$

where the aperture diameter is indicated by the variable a and wherein the 1.7 factor converts FWHM to full width at $1/e^2$ maximum beam intensity.

Clipping intensities are considered for a number of lenses (e.g., lenses available from LightPath of Orlando, Fla., USA), for listed $f_{coll}$ and aperture diameter values. To avoid clipping of the beam, the lenses are selected to have relatively large numerical apertures. As shown in FIG. 5, even standard, relatively high numerical aperture lenses will clip the laser beam if the beam is highly divergent. This clipping will be noticeable (in that small lobes will begin to appear in the beam cross-section focused on the core stream) above about 25 degrees FWHM divergence. Above 30 degrees, the clipping is even more severe, and the lobes' intensities generally increase accordingly.

The unshaded cells in the table of FIG. 5 indicate suitable parameter sets, e.g., beam divergence, aperture diameter, and the focal length of the collimating lens, and, thus, suitable lens and laser diode configurations for implementation in laser optics assembly 200 (FIGS. 1-3), although other suitable parameters and components realizing the same are also contemplated. Considering the suitable parameter sets (e.g., unshaded cells) of FIGS. 4 and 5 together, suitable lens and laser diode configurations for laser optics assembly 200 (FIGS. 1-3) can be achieved that: eliminate profile intensity lobes or reduce the lobes to small or negligible intensities, e.g., at most 7% of the intensity of the main Gaussian peak; provide good TOF capability; enable detection of light scattered at relatively low forward angles and relatively high side angles; and provide good sensitivity to both forward and side scattering, for both depolarized and polarized scattered light.

It is understood that reference to any specific numerical value herein encompasses a range of values to take into account material and manufacturing tolerances generally accepted in the art and/or margins of error of measurement equipment generally accepted in the art.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. A flow cytometer of a blood analyzer, comprising:
   a transverse-electric (TE) laser diode configured to output a laser beam along an optical axis, the laser beam having a fast axis full width at half maximum (FWHM) divergence of from about 16 degrees to about 25 degrees;
   a flow cell;
   a quarter wave plate (QWP) disposed along the optical axis between the TE laser diode and the flow cell, the QWP configured to circularly polarize the laser beam as it passes therethrough;
   a plurality of lenses disposed between the TE laser diode and the flow cell, the plurality of lenses cooperating to focus the laser beam at the flow cell; and
   a side scatter detector configured to detect side-scattered light from the flow cell at angles of about 50 degrees to about 120 degrees relative to the optical axis.

2. The flow cytometer according to claim 1, further comprising at least one forward scatter detector configured to detect forward-scattered light from the flow cell at angles less than about 30 degrees relative to the optical axis.

3. The flow cytometer according to claim 2, wherein the at least one forward scatter detector is configured to detect forward scattered light from the flow cell at angles of about 11.5 degrees to about 15.5 degrees relative to the optical axis.

4. The flow cytometer according to claim 2, wherein the at least one forward scatter detector is configured to detect forward scattered light from the flow cell at angles of from about 2.0 degrees to about 2.4 degrees relative to the optical axis.

5. The flow cytometer according to claim 1, wherein the side-scattered light intensity detected from the flow cell is detected by the side scatter detector at angles of from about 67 degrees to about 89 degrees relative to the optical axis.

6. The flow cytometer according to claim 1, wherein the side scatter detector is centered at about 78 degrees relative to the optical axis.

7. The flow cytometer according to claim 1, wherein the QWP is positioned relative to the TE laser diode such that a centroid angle of incidence of the laser beam on the QWP is equal to or less than about 7 degrees.

8. The flow cytometer according to claim 1, wherein birefringent axes of the QWP are rotated ±45 degrees about the optical axis relative to a polarization axis of the laser beam to thereby right-handedly or left-handedly circularly polarize the laser beam.

9. The flow cytometer according to claim 1, wherein the plurality of lenses includes a collimating lens disposed between the laser diode and the QWP and an objective lens disposed between the QWP and the flow cell.

10. The flow cytometer according to claim 9, wherein the plurality of lenses further includes a positive cylindrical lens and a negative cylindrical lens disposed between the collimating lens and the objective lens.

11. The flow cytometer according to claim 1, wherein the laser beam, at a core stream within the flow cell, defines a beam waist $1/e^2$ diameter in a direction parallel to a flow direction of the core stream of about 6.7 µm to about 9 µm.

12. The flow cytometer according to claim 11, wherein the laser beam, at the core stream within the flow cell, defines a beam $1/e^2$ diameter in a direction perpendicular to the flow direction of the core stream of about 140 µm to about 210 µm.

13. The flow cytometer according to claim 1, wherein the TE laser diode is configured to output a power of at least 10 mW.

14. The flow cytometer according to claim 1, wherein the TE laser diode is configured to output a power of at least 20 mW.

15. A method of detecting reticulocytes and granulocytes, comprising:
   flowing a blood sample having at least one of reticulocytes or granulocytes, together with a sheath fluid, through a flow cell;
   emitting, from a transverse-electric (TE) laser diode, a laser beam along an optical axis, the laser beam having a fast axis full width at half maximum (FWHM) divergence of from about 16 degrees to about 25 degrees;
   passing the laser beam through a quarter wave plate (QWP) disposed along the optical axis between the TE laser diode and the flow cell to circularly polarize the laser beam as it passes therethrough;
   passing the laser beam through a plurality of lenses disposed between the TE laser diode and the flow cell to focus the laser beam at the flow cell; and
   detecting side-scattered light from the flow cell at angles of about 50 degrees to about 120 degrees relative to the optical axis.

16. The method according to claim 15, further comprising detecting scattered light from the flow cell at least at angles less than about 30 degrees relative to the optical axis.

17. The method according to claim 16, wherein scattered light from the flow cell is detected at least at angles of about 11.5 degrees to about 15.5 degrees relative to the optical axis.

18. The method according to claim 16, wherein scattered light from the flow cell is detected at least at angles of about 2.0 degrees to about 2.4 degrees relative to the optical axis.

19. The method according to claim 15, wherein the side-scattered light intensity detected from the flow cell is detected at angles of from about 67 degrees to about 89 degrees relative to the optical axis.

20. The method according to claim 15, wherein a maximum sensitivity to side-scattered light intensity is set at about 78 degrees relative to the optical axis.

21. The method according to claim 15, wherein the QWP is positioned relative to the TE laser diode such that a centroid angle of incidence of the laser beam on the QWP is equal to or less than about 7 degrees.

22. The method according to claim 15, wherein the laser beam passing through the QWP is right-handedly or left-handedly circularly polarized by the QWP.

23. The method according to claim 15, wherein the plurality of lenses includes a collimating lens and wherein the laser beam passes through the collimating lens before the QWP.

24. The method according to claim 23, wherein the plurality of lenses further includes an objective lens and wherein the laser beam passes through the objective lens after the QWP.

25. The method according to claim 15, wherein the laser beam, at a core stream of the flow cell, defines a beam waist $1/e^2$ diameter in a direction parallel to the flowing of about 6.7 µm to about 9 µm.

26. The method according to claim 25, wherein the laser beam, at the core stream of the flow cell, defines a beam $1/e^2$ diameter in a direction perpendicular to the flowing of about 140 µm to about 210 µm.

27. The method according to claim 15, wherein a power output of the TE laser diode for emitting the laser beam is at least 10 mW.

28. The method according to claim 15, wherein a power output of the TE laser diode for emitting the laser beam is at least 20 mW.

\* \* \* \* \*